US011400839B2

(12) United States Patent
Malapati et al.

(10) Patent No.: US 11,400,839 B2
(45) Date of Patent: Aug. 2, 2022

(54) ENERGY ABSORBING VEHICLE SEAT

(71) Applicant: Ford Global Technologies, LLC, Dearborn, MI (US)

(72) Inventors: Srinivas Reddy Malapati, Novi, MI (US); Mangesh Kadam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/027,966

(22) Filed: Sep. 22, 2020

(65) Prior Publication Data
US 2022/0089070 A1  Mar. 24, 2022

(51) Int. Cl.
*B60N 2/427* (2006.01)

(52) U.S. Cl.
CPC ....... *B60N 2/42745* (2013.01); *B60N 2/4279* (2013.01); *B60N 2/42781* (2013.01)

(58) Field of Classification Search
CPC ............ B60N 2/42745; B60N 2/72781; B60N 2/4279
See application file for complete search history.

(56) References Cited

U.S. PATENT DOCUMENTS

| | | | | | |
|---|---|---|---|---|---|
| 3,288,422 | A | * | 11/1966 | Krause ................. | B60N 2/0856 248/429 |
| 3,578,376 | A | * | 5/1971 | Hasegawa ............... | B60N 2/07 296/68.1 |
| 3,832,002 | A | * | 8/1974 | Eggert, Jr ............... | B60R 22/26 297/216.18 |
| 3,832,003 | A | * | 8/1974 | Horvat ................. | B60N 2/4214 297/216.14 |
| 3,845,982 | A | * | 11/1974 | Pickles ................... | B60R 22/26 296/68.1 |
| 3,858,934 | A | * | 1/1975 | Eggert, Jr. ........... | B60N 2/0747 297/216.18 |
| 3,992,046 | A | * | 11/1976 | Braess ................. | B60N 2/4221 296/68.1 |
| 5,112,109 | A | * | 5/1992 | Takada ................. | B60N 2/2222 297/320 |

(Continued)

FOREIGN PATENT DOCUMENTS

| | | | | | |
|---|---|---|---|---|---|
| CN | 103249595 | A | * | 8/2013 | ......... B60N 2/42745 |
| CN | 103842208 | B | * | 9/2016 | ............. B60N 2/682 |

(Continued)

*Primary Examiner* — James M Ference
(74) *Attorney, Agent, or Firm* — Frank A. MacKenzie; Bejin Bieneman PLC

(57) ABSTRACT

The present disclosure relates to a vehicle seat that includes a seat cushion which is substantially horizontal with respect to a floor of a vehicle. The vehicle seat further includes a seat back including a proximal end and a distal end separated by a longitudinal length, such that the proximal end is pivotably coupled to the seat back. The vehicle seat also includes a track arranged adjacent to the seat cushion and the track has a longitudinal length. The track includes a proximal end and a distal end, such that the proximal end of the track is attached to a biasing element while the distal end of the track is attached to a portion of the seat back. In a crash event, the seat back is displaceable with respect to the seat cushion along the longitudinal length of the track.

28 Claims, 11 Drawing Sheets

(56) References Cited

U.S. PATENT DOCUMENTS

| | | | | |
|---|---|---|---|---|
| 5,219,202 | A * | 6/1993 | Rink | B60N 2/42709 297/216.13 |
| 5,344,204 | A * | 9/1994 | Liu | B60N 2/4221 296/68.1 |
| 5,437,494 | A * | 8/1995 | Beauvais | B60N 2/4214 297/216.1 |
| 5,558,399 | A * | 9/1996 | Serber | B60N 2/4221 297/216.1 |
| 5,626,203 | A * | 5/1997 | Habib | B60N 2/0276 180/274 |
| 5,947,543 | A * | 9/1999 | Hubbard | B60N 2/4279 296/68.1 |
| 6,022,074 | A * | 2/2000 | Swedenklef | B60N 2/2222 297/216.14 |
| 6,116,561 | A * | 9/2000 | Christopher | B60N 2/071 248/429 |
| 6,227,597 | B1 * | 5/2001 | Swann | B60N 2/4221 296/68.1 |
| 6,333,686 | B1 * | 12/2001 | Waltzer | B60N 2/4279 340/463 |
| 6,394,535 | B1 * | 5/2002 | Kawamura | B60N 2/4221 296/187.03 |
| 6,398,285 | B2 * | 6/2002 | Motozawa | B60N 2/4221 296/68.1 |
| 6,422,632 | B1 * | 7/2002 | Kamei | B60R 22/1951 296/187.09 |
| 6,454,351 | B2 * | 9/2002 | Motozawa | B60N 2/4221 296/68.1 |
| 6,578,917 | B1 * | 6/2003 | Aubert | B60N 2/002 297/317 |
| 6,629,575 | B2 * | 10/2003 | Nikolov | B60N 2/4214 180/282 |
| 6,641,214 | B2 * | 11/2003 | Veneruso | B64D 11/064 297/322 |
| 9,399,415 | B2 * | 7/2016 | Serber | B60N 2/1853 |
| 9,539,920 | B2 * | 1/2017 | Muller | B60N 2/045 |
| 10,086,728 | B2 * | 10/2018 | White | B60N 2/0244 |
| 2001/0011830 | A1 * | 8/2001 | Nilsson | B60N 2/42727 296/68.1 |
| 2009/0001786 | A1 * | 1/2009 | Haglund | B60N 2/233 297/216.14 |
| 2011/0163574 | A1 * | 7/2011 | Tame | B60N 2/853 297/61 |
| 2013/0200675 | A1 * | 8/2013 | Beneker | B60N 2/0228 297/325 |
| 2014/0070578 | A1 * | 3/2014 | Szelagowski | B60N 2/4221 297/216.13 |
| 2015/0239373 | A1 * | 8/2015 | Weng | B60N 2/42772 297/216.1 |
| 2016/0144746 | A1 * | 5/2016 | Couasnon | B60N 2/0705 384/34 |
| 2017/0152048 | A1 * | 6/2017 | Schmeer | B60N 2/42709 |
| 2017/0197525 | A1 * | 7/2017 | Hattori | B60N 2/073 |
| 2017/0313216 | A1 * | 11/2017 | Line | B60N 2/427 |
| 2020/0398703 | A1 * | 12/2020 | Couasnon | B60N 2/0705 |

FOREIGN PATENT DOCUMENTS

| | | | | |
|---|---|---|---|---|
| CN | 108944589 A | | 12/2018 | |
| CN | 108995816 A | * | 12/2018 | |
| DE | 10054793 A1 | * | 5/2001 | B60N 2/865 |
| DE | 10159847 A1 | * | 6/2003 | B60N 2/888 |
| DE | 10261893 A1 | * | 7/2004 | B60N 2/4279 |
| DE | 102014217811 A1 | * | 3/2016 | B60N 2/08 |
| GB | 1599186 A | * | 9/1981 | B60R 22/26 |
| GB | 2514433 A | * | 11/2014 | B60N 2/427 |
| JP | 2000004977 A | * | 1/2000 | B60N 2/888 |
| JP | 2001515813 A | * | 9/2001 | |
| KR | 100208617 B1 | | 7/1999 | |
| WO | WO-9967105 A1 | * | 12/1999 | B60N 2/42745 |
| WO | 2015/135906 A1 | | 9/2015 | |
| WO | WO-2018146412 A1 | * | 8/2018 | B60N 2/42709 |

* cited by examiner

ENERGY ABSORBING VEHICLE SEAT

TECHNICAL FIELD

The present disclosure relates to a vehicle seat for providing protection during an impact to an occupant inside a vehicle.

BACKGROUND

Vehicles can implement one or more safety features to protect occupants during a vehicle collision. The one or more safety features can include restraint systems, such as seat belts and/or airbags. The one or more safety system can be operable to absorb forces generated by a vehicle collision and/or reduce forces transferred to an occupant's body during the vehicle collision, thereby preventing and/or reducing occupant injury.

SUMMARY

The present disclosure relates to aspects of an energy absorbing vehicle seat for an occupant inside a vehicle. The vehicle seat of the present disclosure can, in some instances, impart motion to the occupant occupying the vehicle seat in an event of sudden braking, deceleration, and/or a collision, thereby operable to reduce bodily injury.

One aspect of the present disclosure relates to a vehicle seat that includes a seat cushion that has a substantially horizontal orientation with respect to a floor of a vehicle. In at least one example, the seat cushion be inclined to the floor by an angle of inclination. The vehicle seat further includes a seat back that has a proximal end and a distal end separated by a longitudinal length. The proximal end of the seat back can be pivotably coupled to the seat cushion. The vehicle seat also includes a track arranged adjacent to the seat cushion and the track has a longitudinal length. The track includes a proximal end and a distal end, such that the proximal end of the track is coupled with a biasing element while the distal end of the track is coupled with a portion of the seat back. In a crash event, the seat back can be displaceable with respect to the seat cushion along the longitudinal length of the track.

In at least one example, the seat back and the seat cushion are coupled by a pyro pin. This prevents displacement of the seat back with respect to the seat cushion unless the pyro pin is severed. In addition, the seat back can have a predetermined displaceable distance and the track can have a predetermined length, such that the predetermined displaceable distance is a portion of the predetermined length and/or substantially equal to the predetermined length.

Another aspect of the present disclosure relates to a vehicle seat that includes a substantially horizontal seat cushion and a seat back pivotably coupled to the seat cushion. Further, the seat back has a longitudinal length that extends between a proximal end adjacent to the seat cushion and a distal end. The vehicle seat also includes a plurality of pivot points that are disposed along the longitudinal length of the seat back and each of the plurality of pivot points has a predetermined pivot resistance. Each of the plurality of pivot points pivots in a crash event. In one example, each pivot point includes a resistance material and a cutter that engages with the resistance material during the pivoting of the pivot points.

Yet another aspect of the present disclosure relates to a vehicle seat that includes a substantially horizontal seat cushion and a seat back that is pivotably coupled to the seat cushion at a proximal end of the seat back. The seat back has a longitudinal length and includes a distal end opposite to the proximal end. The vehicle seat also includes a track mounted adjacent to the seat cushion and is coupled to one or more fixation points. The track has a longitudinal length that extends between a proximal end and a distal end of the track. The track also includes a biasing element coupled to the proximal end of the track and a portion of the seat cushion. During a crash event, the track allows the seat cushion and the seat back to displace relative to the one or more fixation points along the longitudinal length of the track.

BRIEF DESCRIPTION OF THE DRAWINGS

The above-mentioned aspects are further described herein with reference to the accompanying figures. It should be noted that the description and the accompanying figures relate to exemplary aspects and should not be construed as a limitation to the present disclosure. It is also to be understood that various arrangements may be devised that, although not explicitly described or shown herein, embody the principles of the present disclosure. Moreover, all statements herein reciting principles, aspects, and aspects of the present disclosure, as well as specific examples, are intended to encompass equivalents thereof.

DETAILED DESCRIPTION

In the following description, certain specific details are set forth in order to provide a thorough understanding of various disclosed aspects. However, one skilled in the relevant art will recognize that aspects may be practiced without one or more of these specific details, or with other methods, components, materials, etc.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Reference throughout this specification to "one aspect" or "an aspect" means that a particular feature, structure or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The present disclosure relates to a vehicle seat operable to absorb and/or reduce force transfer to an occupant during a crash event, thereby reducing potential injury to an occupant. The vehicle seat can be implemented in a occupant operated, semi-autonomous, and/or autonomous vehicle and can be arranged in forward facing and/or rear facing arrangements.

Figure 1:
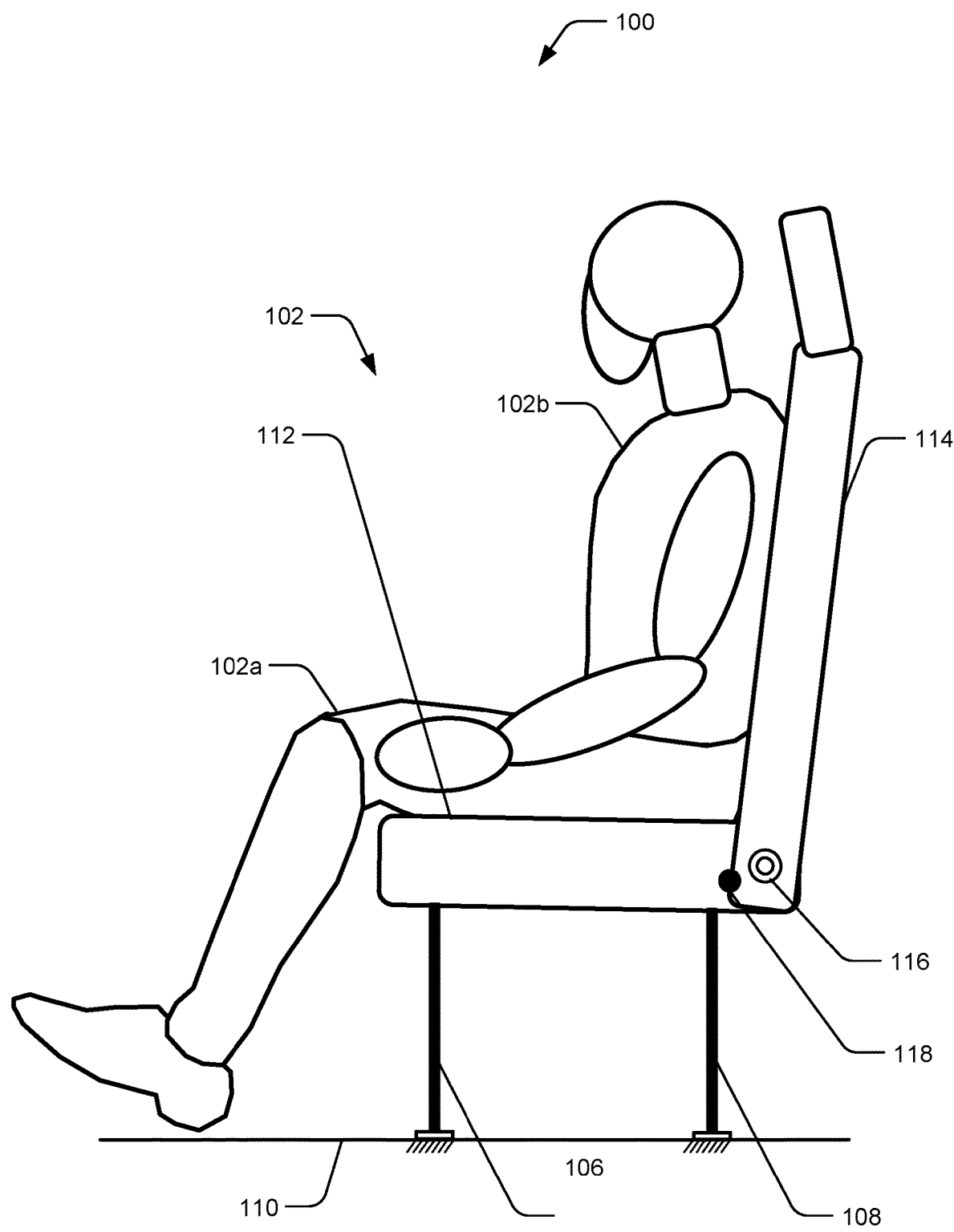
FIG. 1 illustrates a vehicle seat, in accordance with one aspect of the present disclosure.

FIG. 1 illustrates a vehicle seat 100 in accordance with one aspect of the present disclosure. The vehicle seat 100 can be installed in a vehicle (not shown in the Figure) and is configured to allow an occupant 102 to sit inside the vehicle. The vehicle may be any vehicle such as a car, van, or bus (including, but not limited to, an autonomous or semi-autonomous vehicle), using all known methods of powertrain and propulsion systems (e.g., combustion engine, battery electric, hybrid, etc.). The occupant 102 can be a driver or a passenger. The vehicle seat 100 includes a one or more support legs, such as legs 106, 108, that mounts the vehicle seat 100 on a floor 110 of the vehicle. In the illustrated example, the legs 106, 108 are mounted at attachment location on the floor 110 using fasteners, such as, but not limited to, nuts and bolts.

Further, based on a design of the vehicle, the vehicle seat 100 can be mounted in different orientations. For instance, the vehicle seat 100 can be mounted in a forward-facing orientation, such that the occupant 102 faces towards a front end of the vehicle. In other words, the vehicle seat 100 is forward oriented. In another instances, the vehicle seat 100 can be mounted in a rearward-facing orientation, such that the occupant faces towards a rear end of the vehicle. In other words, the vehicle seat is rearward oriented. In autonomous vehicle, both the driver and passenger seats can be forward orientation, rearward oriented, and/or combinations thereof. In semi-autonomous/manual vehicle, only the passenger seats can be rearward oriented.

According to an example of the present disclosure, the vehicle seat 100 includes a seat cushion 112 that forms a base of the vehicle seat 100. Further, the seat cushion 112, supported by the legs 106, 108, is configured to receive a lower portion 102a of the occupant 102. Although not shown, the seat cushion 112 is made of a frame with foam material applied around on the frame to make the seat cushion 112 suitable for sitting for the occupant 102.

The vehicle seat 100 also includes a seat back 114 that is pivotably coupled to the seat cushion 112 and is configured to receive an upper portion 102b of the occupant 102. The vehicle seat 100 also includes a pivoting mechanism 116 that is operable by the occupant 102 to allow the seat back 114 to pivot with respect to the seat cushion 112 to assume different pivoted positions vis-à-vis the seat cushion 112.

According to an example, the vehicle seat 100 is configured to impart motion to the occupant 102 occupying the vehicle seat 100 in an event of sudden braking/deceleration or a crash event in order to absorb an impact received therefrom. To accomplish this, the vehicle seat 100 includes an actuating mechanism 118 that enables the vehicle seat 100 to impart the motion. For instance, the actuating mechanism 118 enables a displacement of the occupant 102 with respect to the floor 110. The actuating mechanism 118 can be coupled to either the seat cushion 112 or the seat back 114, or both to impart the motion to the occupant 102.

In one example, the seat back 114 can be displaced with respect to the seat cushion 112 to impart motion to the occupant 102. In another example, the seat back 114 can be pivoted with respect to the seat cushion 112 to impart motion to the occupant 102. In yet another example, both the seat back 114 and the seat cushion 112 can be displaced with respect to the floor 110 to induce motion of the occupant 102. In yet another example, a combination of displacement of the seat back 114 and pivoting of the seat back 114 can be achieved to impart motion to the occupant 102. Moreover, the actuating mechanism 118 operates automatically without human intervention when the vehicle experiences a collision or the impact. Exemplary aspects of each of the aforementioned examples are described in subsequent paragraphs.

Figure 2A:
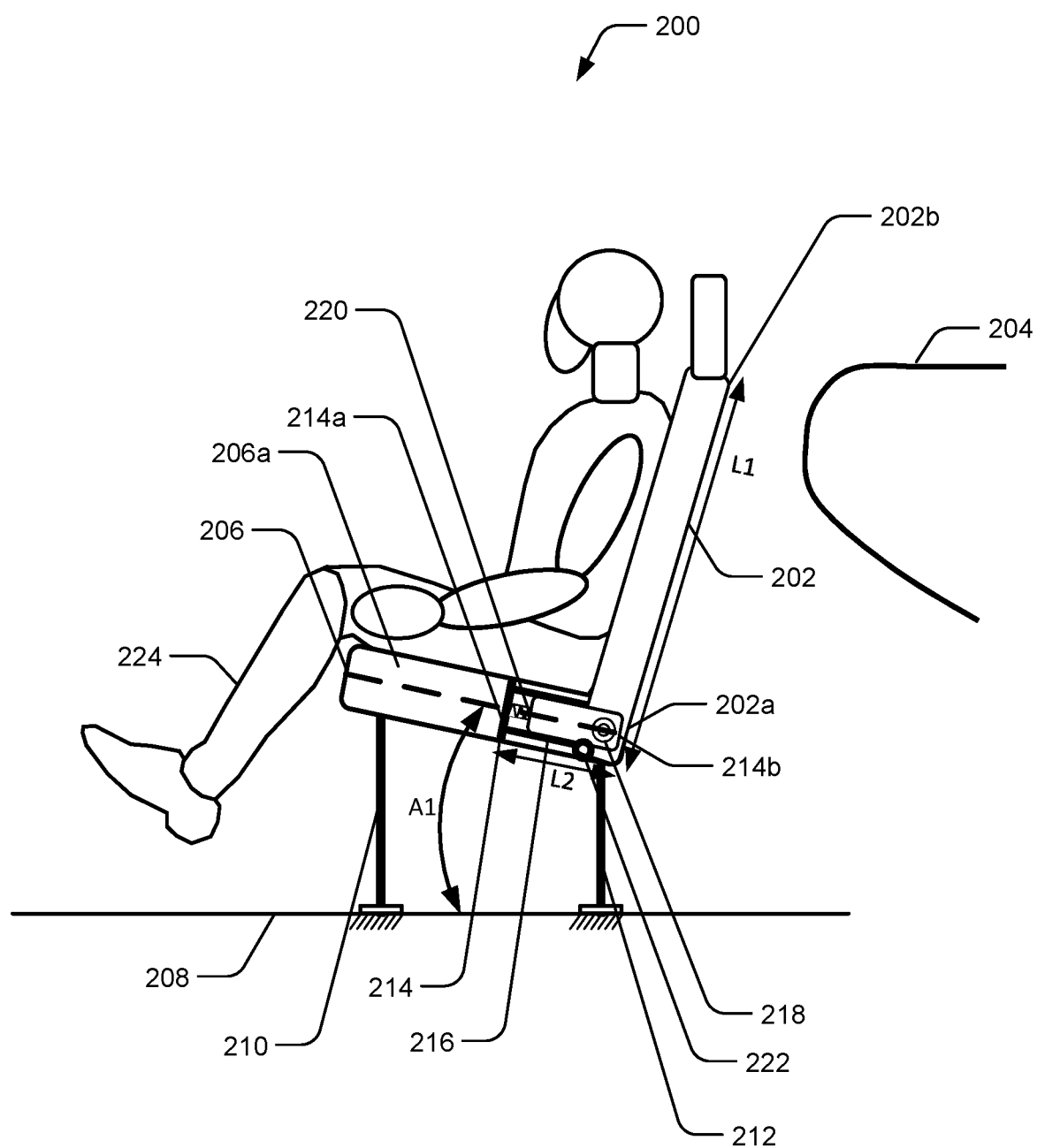
FIG. 2a illustrates a vehicle seat with a displaceable seat back in an initial position, in accordance with one aspect of the present disclosure.
Figure 2B:
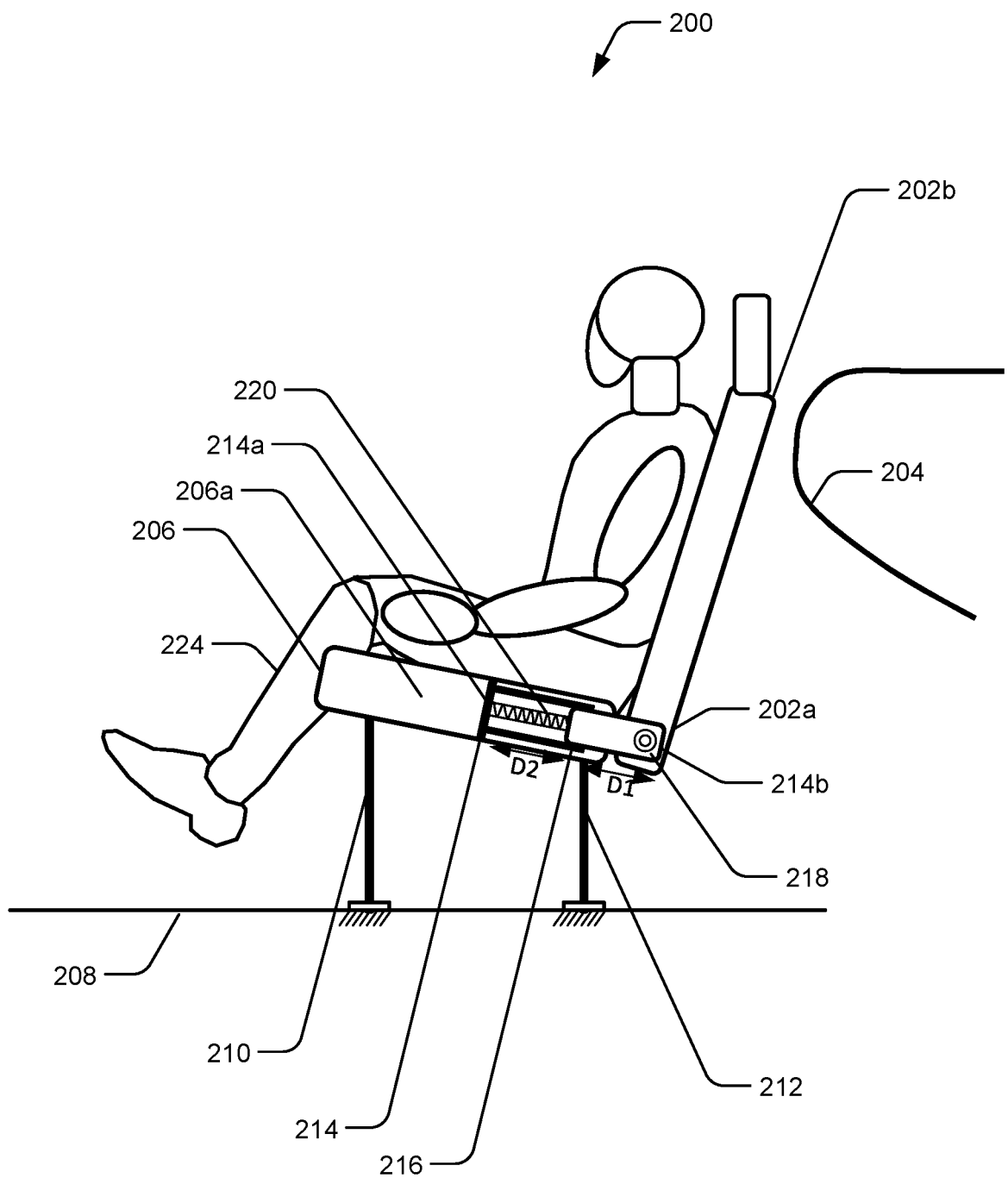
FIG. 2b illustrates the vehicle seat of FIG. 2a with the displaceable seat back in a final position.

FIGS. 2a and 2b illustrate a vehicle seat 200 with a displaceable seat back 202, in accordance with one aspect of the present disclosure. FIG. 2a illustrates the vehicle seat 200 in an initial position while FIG. 2b illustrates the vehicle seat 200 in a final position. The initial position refers to a position of the vehicle seat 200 before an event of sudden braking, deceleration and/or a crash event. The final position refers to a position of the vehicle seat 200 when the vehicle experiences an impact due to the sudden braking, deceleration and/or the crash event.

In the illustrated example, the vehicle seat 200 is rearward orientated with respect to the vehicle. In other words, the vehicle seat 200 is mounted in such a way that a front portion of an occupant 224 faces towards a rear end of the vehicle while a back portion of the occupant 224 faces an interior panel 204 of the vehicle. In another example, the vehicle seat 200 can be forward oriented with respect to the vehicle. In other words, the vehicle seat 200 is mounted in such a way that the front portion of the occupant 224 faces the interior panel 204 of the vehicle.

A rearward facing seat, as illustrated, can assist in the reduction of force and/or injury to an occupant in a forward collision, while a forward facing seat can assist in the reduction of force and/or injury to an occupant in a rear-end collision.

As shown in FIGS. 2a and 2b, the vehicle seat 200 includes a seat cushion 206 that has a substantially horizontal orientation with respect to a floor 208 of the vehicle. While the seat cushion 206 is substantially horizontal orientation relative to the floor 208, the seat cushion 206 can have varying inclinations relative to the floor 208, at least in part for ergonomic purposes, while still maintaining a substantially horizontal orientation. In at least some instances, the seat cushion 206 can be user adjustable angle of inclination in a positive and/or negative inclination relative to a true horizontal. The deviation in inclination from true horizontal is within the context of substantially horizontal as used throughout this disclosure. For instance, the seat cushion 206 can be inclined to the floor 208 by an angle of inclination A1, which can be a positive angle of inclination relative to the floor 208 and/or a negative angle of inclination relative to the floor 208. In one example, the angle of inclination A1 may range from about −20-degrees (°) to 20 degrees (°). The seat cushion 206 can be inclined with respect to the floor 208 to provide adequate comfort to the occupant 224 when the occupant 224 sits on the vehicle seat 200. In the illustrated example, the angle of inclination A1 is set based on various factors, such as space available inside the vehicle, human ergonomic, user preference, and the like. Although the present illustration shows the seat cushion 206 inclined with respect to the floor 208, the seat cushion 206 can be substantially horizontal with respect to the floor 208, similar to the seat cushion 112 shown in FIG. 1. In the illustrated example, the vehicle seat 200 is fixedly attached to the floor 208 by a plurality of legs, such as legs 210, 212. The seat back 202 is pivotably coupled with the seat cushion 206 to assume a plurality of positions with respect to the seat cushion 206. The seat back 202 has a proximal end 202a adjacent to the seat cushion 206, a distal end 202b, and a longitudinal length L1 between the proximal end 202a and the distal end 202b. Structurally, the seat back 202 and the seat cushion 206 can be similar to the seat back 114 and the seat cushion 112, respectively, as shown in FIG. 1.

According to an example, the vehicle seat 200 includes a track 214 that is mounted adjacent to the seat cushion 206. For instance, the track 214 can be mounted on a side 206a of the seat cushion 206. Although not shown, another track can be mounted on another side of the seat cushion 206, opposite to the side 206a. The track 214 has a longitudinal length L2 that extends from a proximal end 214a to a distal end 214b of the track 214. The track 214 includes a rail 216 coupled to the seat cushion 206 and a guide 218. In the illustrated example, the guide 218 defines the distal end 214b of the track 214, such that the guide 218 is coupled to the proximal end 202a of the seat back 202. The guide 218, in one example, includes wheels or rollers to traverse the rail 216 to enable the displacement of the seat back 202. Further, the guide 218 is installed with respect to the rail 216 in such a way that the guide 218 prevents any lateral movement of the seat back 202 while the seat back 202 displaces, thereby ensuring smooth displacement of the seat back 202.

The track 214, in operation, enables the seat back 202 to displace with respect to the seat cushion 206 during the crash event or any sudden deceleration. For instance, the track 214 enables the seat back 202 to displace towards the interior panel 204 when the vehicle experiences a collision at the front end of the vehicle. In another instance, the track 214 enables the seat back 202 to displace away from the interior panel 204 when the vehicle experiences a collision from the rear end of the vehicle.

The vehicle seat 200 includes a biasing element 220 installed proximate to the track 214. One end of the biasing element 220 is coupled to the proximal end 214a of the track 214 while another end of the biasing element 220 is coupled to at least one portion of the seat back 202. For instance, another end of the biasing element 220 may be attached to the proximal end 202a of the seat back 202. In one example, the biasing element 220 is an elastic material that has a linear displacement, such as a coil spring. In another example, the biasing element 220 is an elastic material, which has a non-linear displacement, such as a torsion spring. As shown, the biasing element 220 can be energized during the assembly of the vehicle seat 200 so that the biasing element 220 can facilitate the displacement of the guide 218 with respect to the track 214.

According to an example, the vehicle seat 200 includes a pyro pin 222 that couples the seat back 202 and the seat cushion 206. Accordingly, the pyro pin 222 has two ends such that one end of the pyro pin 222 is coupled to the seat back 202 while another end of the pyro pin 222 is coupled to the seat cushion 206. Further, the pyro pin 222 includes a material which is capable of being severed when heat is applied thereto by a triggering unit (not shown in FIG. 1) housed in the pyro pin 222. In one example, the pyro pin 222 is connected to one or more impact sensors (not shown) that can sense the crash event. Moreover, the impact sensors can trigger the triggering unit housed in the pyro pin 222 to generate the heat to sever the material of the pyro pin 222 to allow relative movement between the seat back 202 and the seat cushion 206.

According to an example of the present disclosure, the seat back 202 has a predetermined displaceable distance D1, as shown in FIG. 2b. The predetermined displaceable distance D1 is a maximum distance by which the seat back 202 will displace with respect to the seat cushion 206. Similarly, the track 214 has a predetermined length D2 shown in FIG. 2b. The predetermined length D2 of the track 214 is a maximum length that the guide 218 and the seat back 202 can traverse when the seat back 202 displaces. In one example, the predetermined displaceable distance D1 is substantially equal to the predetermined length D2. Depending on the severity of the crash event, the seat back 202 can displace a portion of, or the entire predetermined displaceable distance D1.

An operation of the vehicle seat 200 is now explained. The vehicle seat 200 assumes the initial position as shown in FIG. 2a. In the initial position, the pyro pin 222 holds the seat back 202, such that the seat back 202 is prevented from displacing with respect to the seat cushion 206. Now, in case the vehicle experiences the crash event, the one or more impact sensors detect the crash event and accordingly, triggers the generation of heat that causes self-destruction of the pyro pin 222. As the pyro pin 222 is severed the biasing element 220 pushes the seat back 202 in a direction of impact, for instance, towards the interior panel 204 as shown in FIG. 2b. Further, the movement of the seat back 202 is assisted by the rail 216 and the guide 218. For instance, the guide 218 slides within the rail 216 to allow the movement of the seat back 202. Movement of the seat back 202 increases the time period for which the impact is received by the occupant 224 thereby reducing the effect of the impact.

Figure 3A:
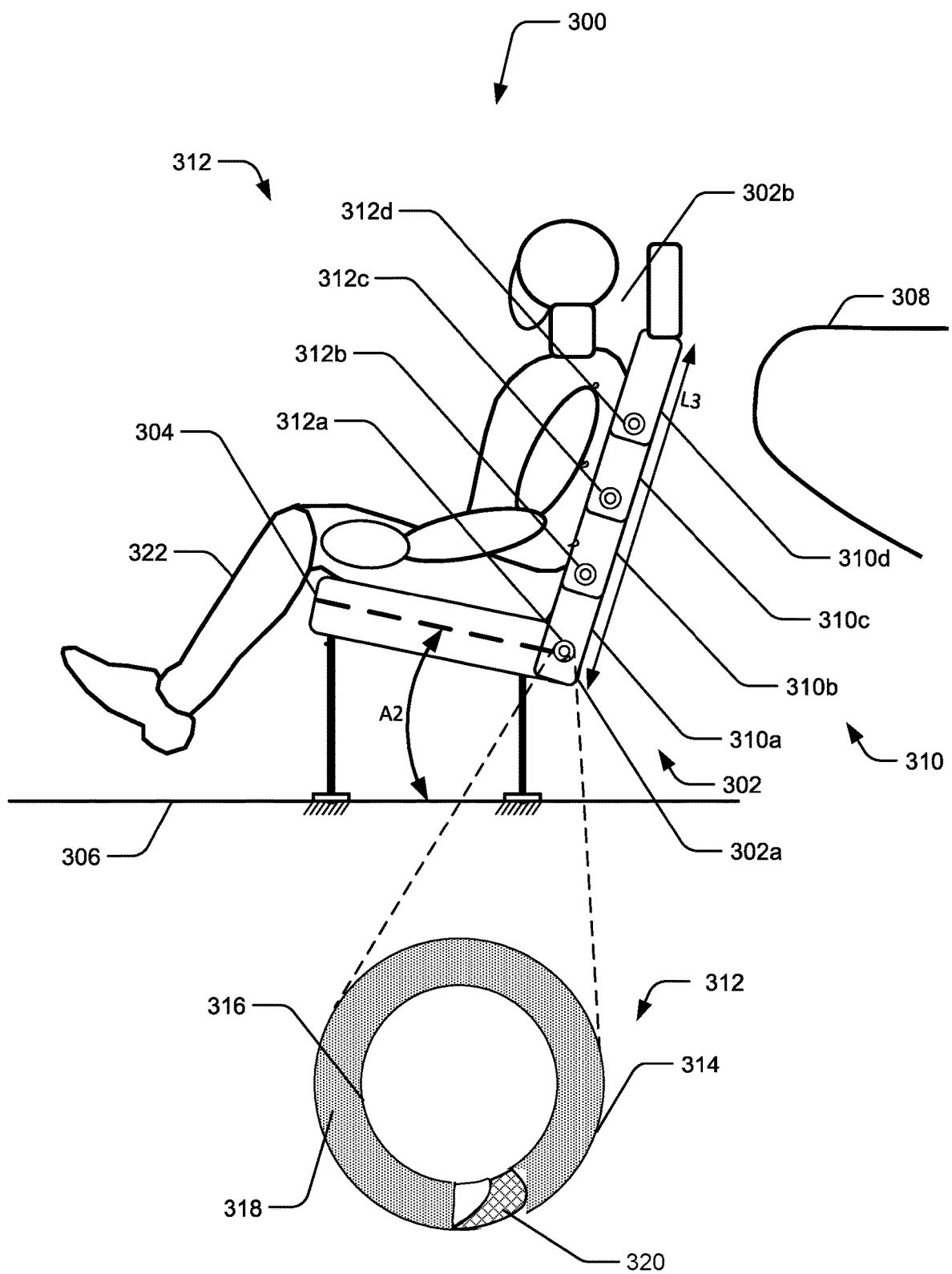
FIG. 3a illustrates another vehicle seat with a pivotable seat back in an initial position, in accordance with one aspect of the present disclosure.
Figure 3B:
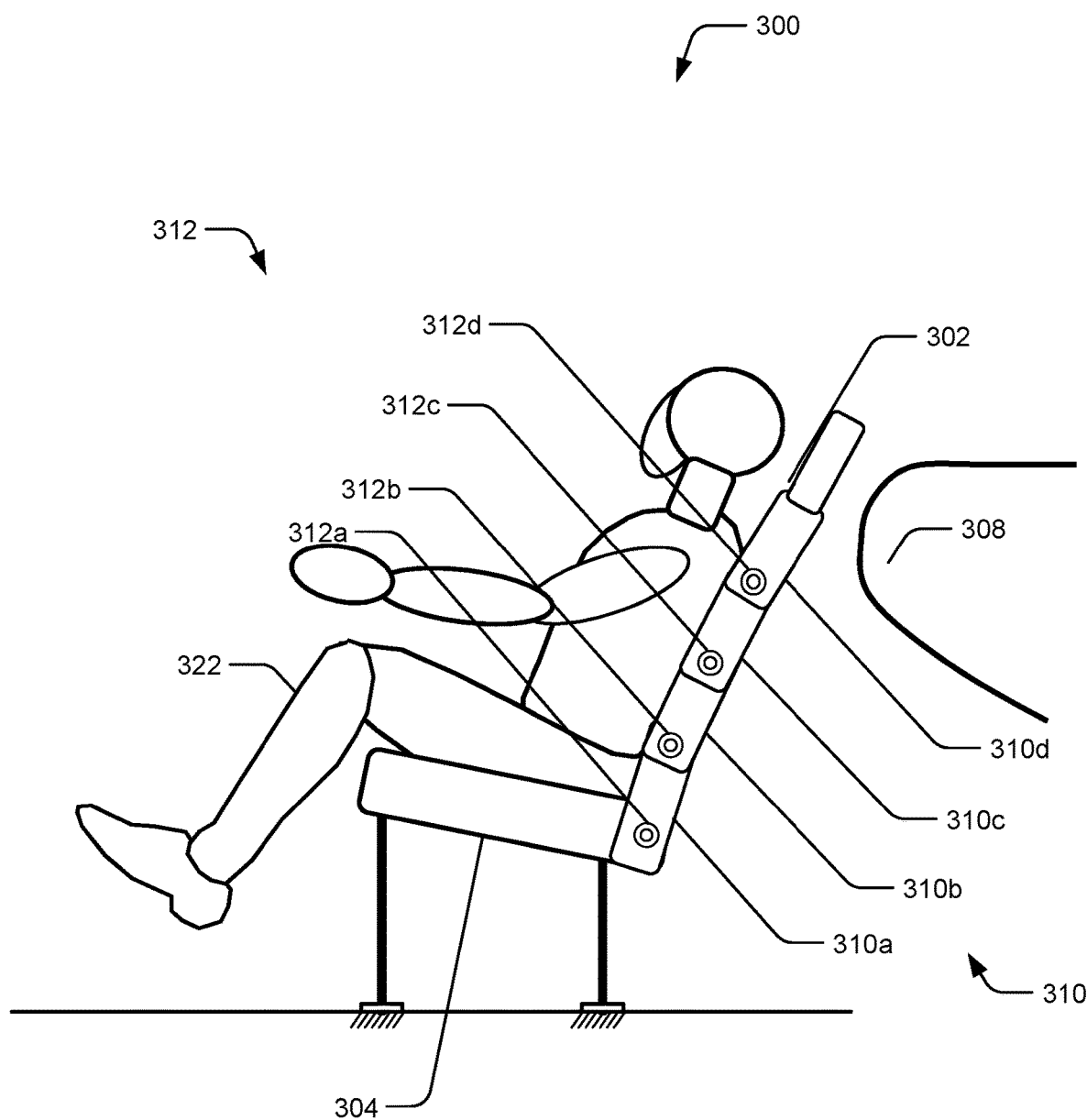
FIG. 3b illustrates the vehicle seat of FIG. 3a with the pivotable seat back in a final position.

FIGS. 3a and 3b illustrate another vehicle seat 300 with a seat back 302 that can pivot at a plurality of positions, in accordance with one aspect of the present disclosure. FIG. 3a illustrates the vehicle seat 300 in an initial position while FIG. 3b illustrates the vehicle seat 300 in a final position. The initial position refers to a position of the vehicle seat 300 before an event of sudden braking/deceleration or a crash event. The final position refers to a position of the vehicle seat 300 when the vehicle experiences an impact due to the sudden braking/deceleration or the crash event.

The vehicle seat 300 includes a seat cushion 304 t. In one example, the seat cushion 304 can have a substantially horizontal orientation with respect to a floor 306 of the vehicle. In another example, the seat cushion 304 is inclined with respect to the floor 306 by an angle of inclination A2 to provide adequate comfort for an occupant 322 when the occupant 322 sits in the vehicle seat 300, which can be a positive angle of inclination relative to the floor 306 and/or a negative angle of inclination relative to the floor 306. In one example, the angle of inclination A2 may range from about −20-degrees (°) to 20 degrees (°). In the illustrated example, the angle of inclination A2 is set based on various aforementioned factors, such as space available inside the vehicle, human ergonomic, user preferences, and the like.

In the illustrated example the vehicle seat 300 is mounted in such a way that a front portion of the occupant 322 faces towards a rear end of the vehicle while a back portion of the occupant 322 faces an interior panel 308 of the vehicle. In other words, the vehicle seat 300 is rearward oriented. In another example, the vehicle seat 300 can have a forward orientation such that the occupant 322 faces the interior panel 308.

In one example, the seat back 302 is pivotably coupled to the seat cushion 304, such that the seat back 302 can bend with respect to the seat cushion 304. Further, the seat back 302 is made of a plurality of sections 310a, 310b, 310c, and 310d, collectively referred to as plurality of sections 310 hereinafter. Further, each of the plurality of sections 310 has a predetermined section height that collectively defines a longitudinal length L3 of the seat back 302. In an example, the predetermined section height of each of the plurality of sections 310 is equal. In an alternate example, the predetermined section height of each of the plurality of sections 310 can be different. Furthermore, one end of the section 310a defines a proximal end 302a of the seat back 302, which is adjacent to the seat cushion 304. On the other hand, one end of the section 310d defines a distal end 302b of the seat back 302. The longitudinal length L3 extends from the proximal end 302a of the seat back 302 to the distal end 302b of the seat back 302.

According to an example, the vehicle seat 300 includes a plurality of pivot points 312a, 312b, 312c, and 312d, collectively referred to as plurality of pivot points 312 hereinafter. The plurality of pivot points 312 are disposed along the longitudinal length L3 of the seat back 302. Specifically, the pivot point 312a couples the section 310a with the seat cushion 304 while the pivot points 312b, 312c, and 312d pivotably couple adjacent sections 310b, 310c, and 310d respectively as shown in the FIG. 3a.

In operation, the plurality of pivot points 312 enables the pivoting of the plurality of sections 310 in a direction of the impact to reduce the effect of the impact. For instance, the plurality of pivot points 312 enables the pivoting of the plurality of sections 310 towards the interior panel 308 when the vehicle experiences a collision at the front end of the vehicle. In another instance, the plurality of pivot points 312 enables the pivoting of the plurality of sections 310 away from the interior panel 308 when the vehicle experiences a collision from the rear end of the vehicle.

Further, each pivot point 312a, 312b, 312c and 312d has a predetermined pivot resistance. The predetermined pivot resistance can be understood as a resistance of the pivot point against a force acting thereupon so that the pivot point is prevented from pivoting unless the force acting on the pivot exceeds a threshold measure. The threshold measure is a function of the predetermined pivot resistance. Accordingly, the pivot points 312 do not pivot until a force more than the predetermined pivot resistance is applied to the pivot points 312. It should be noted that the crash event offers a force that exceeds the predetermined pivot resistance and the pivot points 312 therefore, pivot in the crash event.

As shown in an enlarged view in the FIG. 3a, each the plurality of pivot point 312 includes a casing 314 and a rotatable mount 316. The casing 314 is attached to one section of the plurality of sections 310, while the rotatable mount 316 is attached to an adjacent section of the plurality of sections 310. For example, the casing 314 corresponding to the pivot point 312b is attached to the section 310b, while the rotatable mount 316 corresponding to the pivot point 312b is attached to the adjacent section 310c. The rotatable mount 316 rotates with respect to the casing 314 to cause a pivoting motion of the pivot points 312. The pivot points 312 also houses a resistance material 318 positioned between the casing 314 and the rotatable mount 316 and a cutter 320 that is coupled to the rotatable mount 316.

In the illustrated example, the resistance material 318 prevents rotation of the rotatable mount 316 by offering the predetermined pivot resistance. Further, in order to rotate the rotatable mount 316, the cutter 320 is engaged with the resistance material 318. In one example, a force greater than the predetermined pivot resistance is applied to the cutter 320 that causes the cutter 320 to sever the resistance material 318 thereby allowing pivoting of the pivot point 312. Although the present illustration shows the pivot points 312 including the severable resistance material, the pivot points 312 can be of a different design. For instance, the pivot points 312 can be elastic material, such as coil springs whose pivot resistance is linear. In another example, the pivot points 312 can be elastic material, such as torsion springs whose pivot resistance is non-linear.

An operation of the vehicle seat 300 is now described. Initially, the vehicle seat 300 is at the initial position as shown in FIG. 3a. The initial position is maintained until the vehicle experiences the crash event. In the crash event, such as frontal collision, the vehicle receives an impact caused by a sudden deceleration. Further, the received impact forces the occupant 322 and the vehicle seat 300 towards the interior panel 308. Further, the force is transmitted to the seat back 302 and eventually to the pivot points 312.

In case the received force exceeds the predetermined pivot resistance, the cutter 320 starts severing a portion of the resistance material 318 thereby allowing the rotatable mount 316 to rotate with respect to the casing 314. As a result, the pivot points 312 enables the pivoting of the sections 310 with respect to the seat cushion. The cutter 320 removes additional portions of the resistance material 318 to allow further pivoting of the rotatable mount 316. Since portions of the resistance material 318 are severed to allow the rotatable mount 316 to rotate, force of the impact is absorbed by the resistance material 318. Moreover, since the resistance material 318 is prevented from being severed before the rotatable mount 316 can rotate, the pivoting of the pivot points 312 is at a slower rate than in case where the resistance material was not present. As a result, the force acting on the occupant 322 imparted by the crash event is dampened by the pivot points 312 thereby preventing injury to the occupant 322.

While the present disclosure illustrates a seat back 302 having four pivot points 312, it is within the scope of this disclosure to implement any number of pivot points 312 including, but not limited to, one pivot point, two pivot points, three pivot points, five pivot points, and/or more pivot points.

Figure 4A:
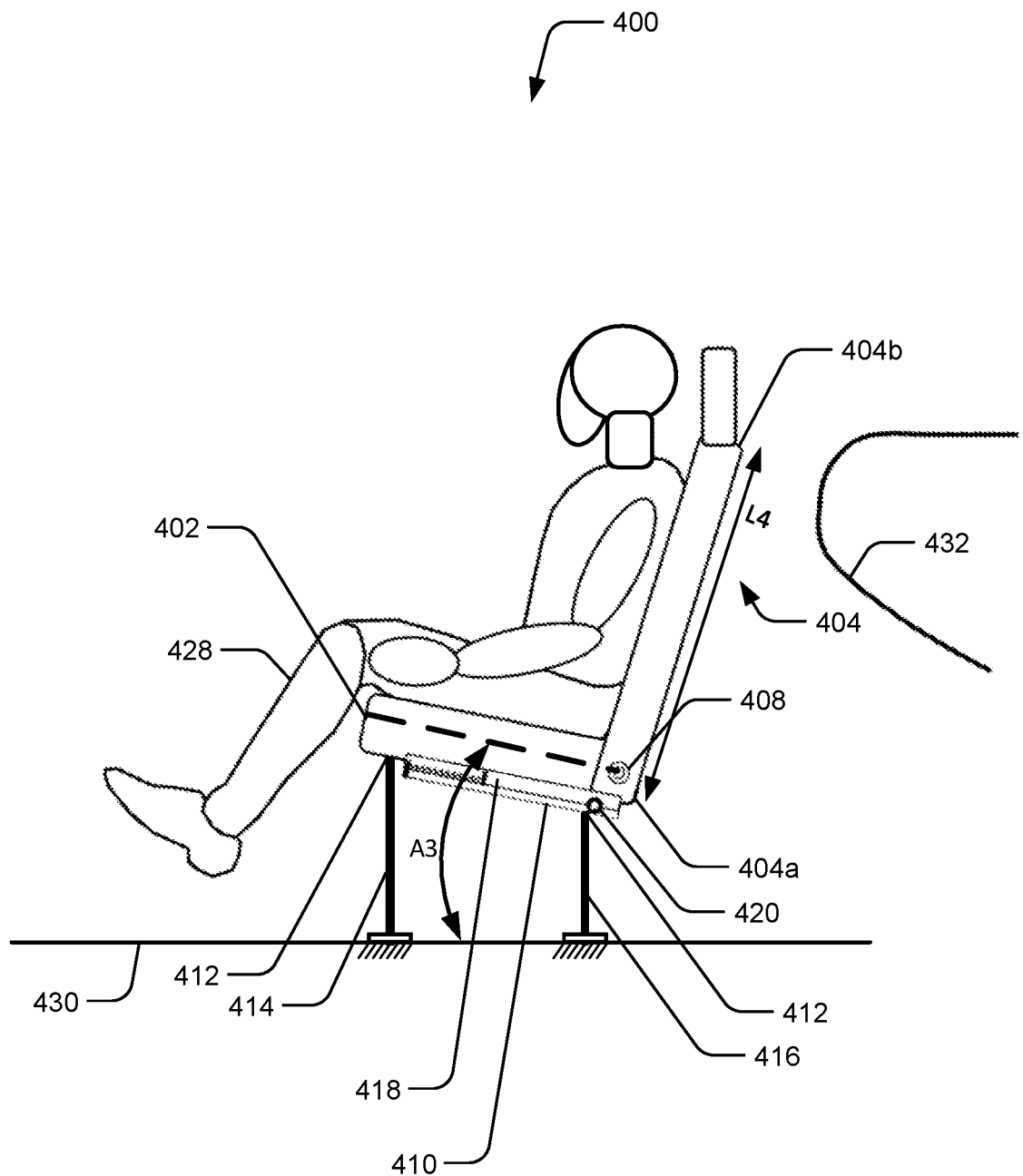
FIG. 4a illustrates yet another vehicle seat in an initial position with a displaceable seat back and a seat cushion in an initial position, in accordance with one aspect of the present disclosure.
Figure 4B:
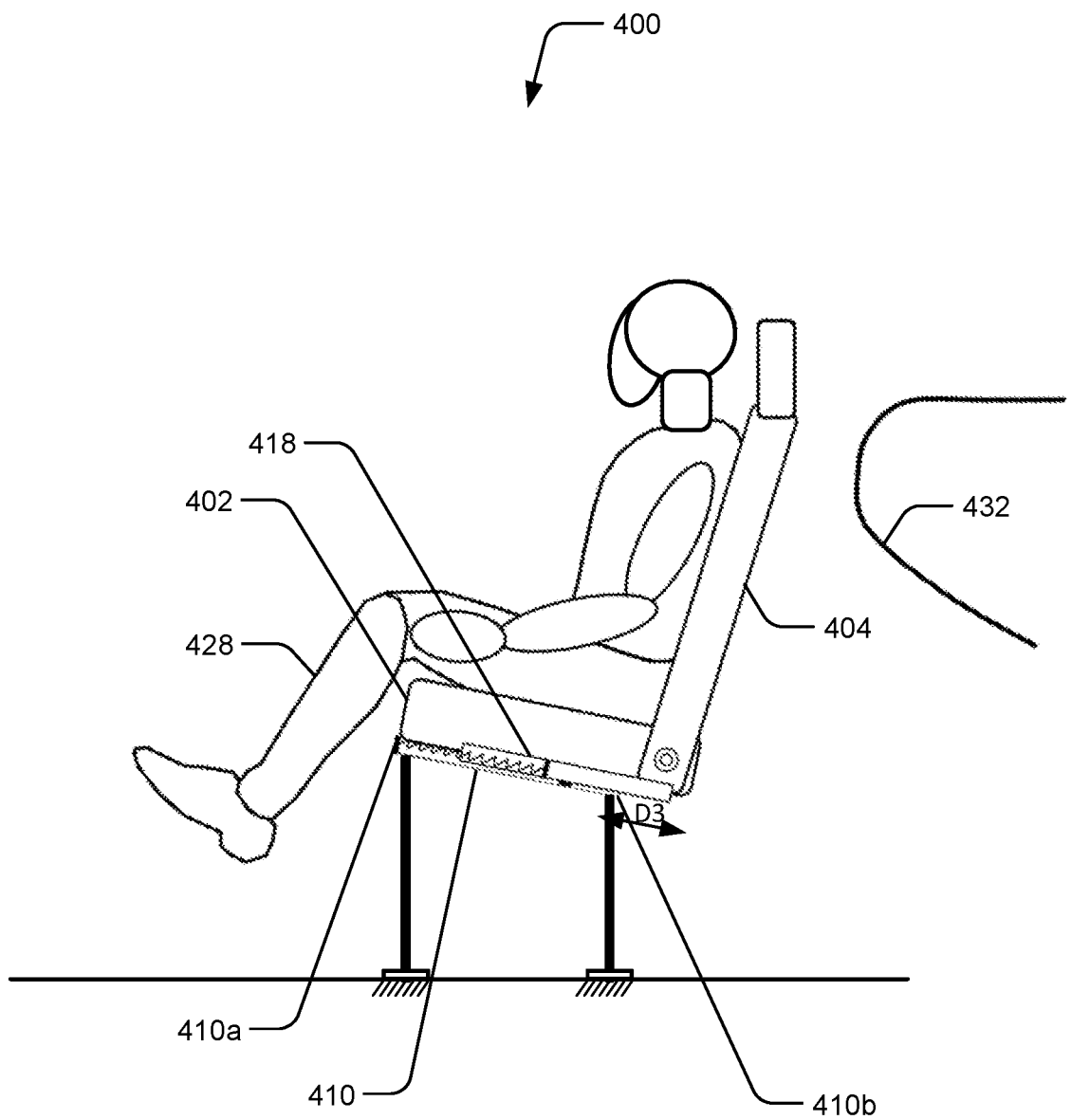
FIG. 4b illustrates the vehicle seat of FIG. 4a with the displaceable seat back and a seat cushion in a final position.

FIGS. 4a and 4b illustrate another vehicle seat 400 with a displaceable seat cushion 402 and a seat back 404, in accordance with one aspect of the present disclosure. FIG. 4a illustrates the vehicle seat 400 at an initial position while FIG. 4b illustrates the vehicle seat 400 at a final position. The initial position refers to a position of the vehicle seat 400 before an event of sudden braking/deceleration or a crash event. The final position refers to a position of the vehicle seat 400 when the vehicle experiences an impact due to the sudden braking/deceleration or the crash event. While the vehicle seat 200 provides protection by displacing the seat back 202 (as illustrated in FIGS. 2a and 2b) and the vehicle seat 300 provides protection by pivoting the seat back 302 (as illustrated in FIGS. 3a and 3b), the vehicle seat 400 protects an occupant 428 by displacing both the seat cushion 402 and the seat back 404 relative to a floor 430 of the vehicle.

In one example, the seat cushion 402 displaces and the seat back 404 moves towards or away from an interior panel 432 inside the vehicle based on a direction of impact. Specifically, the vehicle seat 400 protects the occupant 428 by moving the seat cushion 402 and the seat back 404 together in the direction of impact to absorb the impact. For instance, the displacement of the seat cushion 402 and the seat back 404 would be towards the interior panel 432 when the vehicle experiences the front collision. On the other hand, the displacement of the seat cushion 402 and that of the seat back 404 would be away from the interior panel 432 when the vehicle experiences a rear collision.

In the illustrated example, the seat cushion 402 is inclined to the floor 430 by an angle of inclination A3 that may be provided based on various factors as mentioned above with respect to FIGS. 2a and 3a. In one example, the angle of inclination A3 may range from about −20-degrees (°) to 20 degrees (°). In one example, the seat cushion 402 is pivotably coupled to the seat back 404 by a pivoting mechanism 408. The pivoting mechanism 408 can be similar to the pivoting mechanism 116 shown in FIG. 1. In the illustrated example, the seat back 404 is also structurally similar to the seat back 202 shown in FIG. 2a. Specifically, the seat back 404 also has a longitudinal length L4 that extends from a proximal end 404a adjacent to the seat cushion 402 to a distal end 404b of the seat back 404. Further, the seat cushion 402 and the seat back 404 have a predetermined displaceable distance D3 which is a distance by which the seat cushion 402 and the seat back 404 can displace in order to absorb energy of the crash event.

In an example, the vehicle seat 400 includes a track 410 that is coupled to one or more fixation points 416 of a plurality of legs 412 and 414 of the vehicle seat 400. Further, the track 410 remains stationary with respect to the seat cushion 402 when the seat cushion 402 displaces. The vehicle seat 400 also includes a guide 418 installed proximate to the seat cushion 402. In one example, the track 410 is arranged adjacent to the seat cushion 402 and the guide 418 is attached to the seat cushion 402 such that the seat cushion 402 displaces relative to the track 410. For instance, the track 410 is coupled to the fixation points 416 in such a way that the track 410 is placed adjacent to one side of the seat cushion 402. Constructional details of the track 410 and the guide 418 are provided in FIG. 5a. The vehicle seat 400 also includes other structural elements that are similar to the structural elements of the vehicle seat 200 shown in FIG. 2a.

Figure 5A:
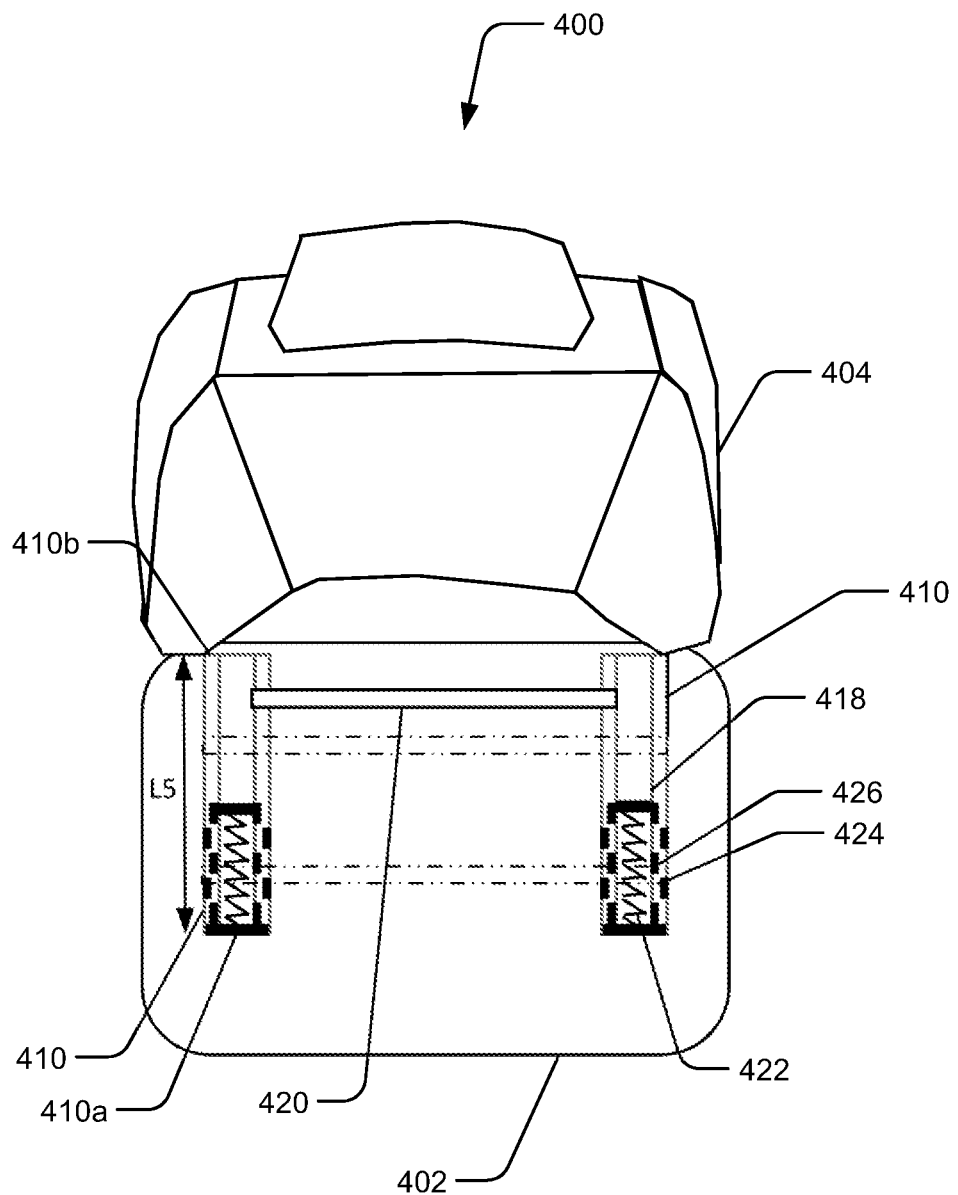
FIG. 5a illustrates a track and a guide disposed on the vehicle seat of FIGS. 4a and 4b, in an initial position.
Figure 5B:
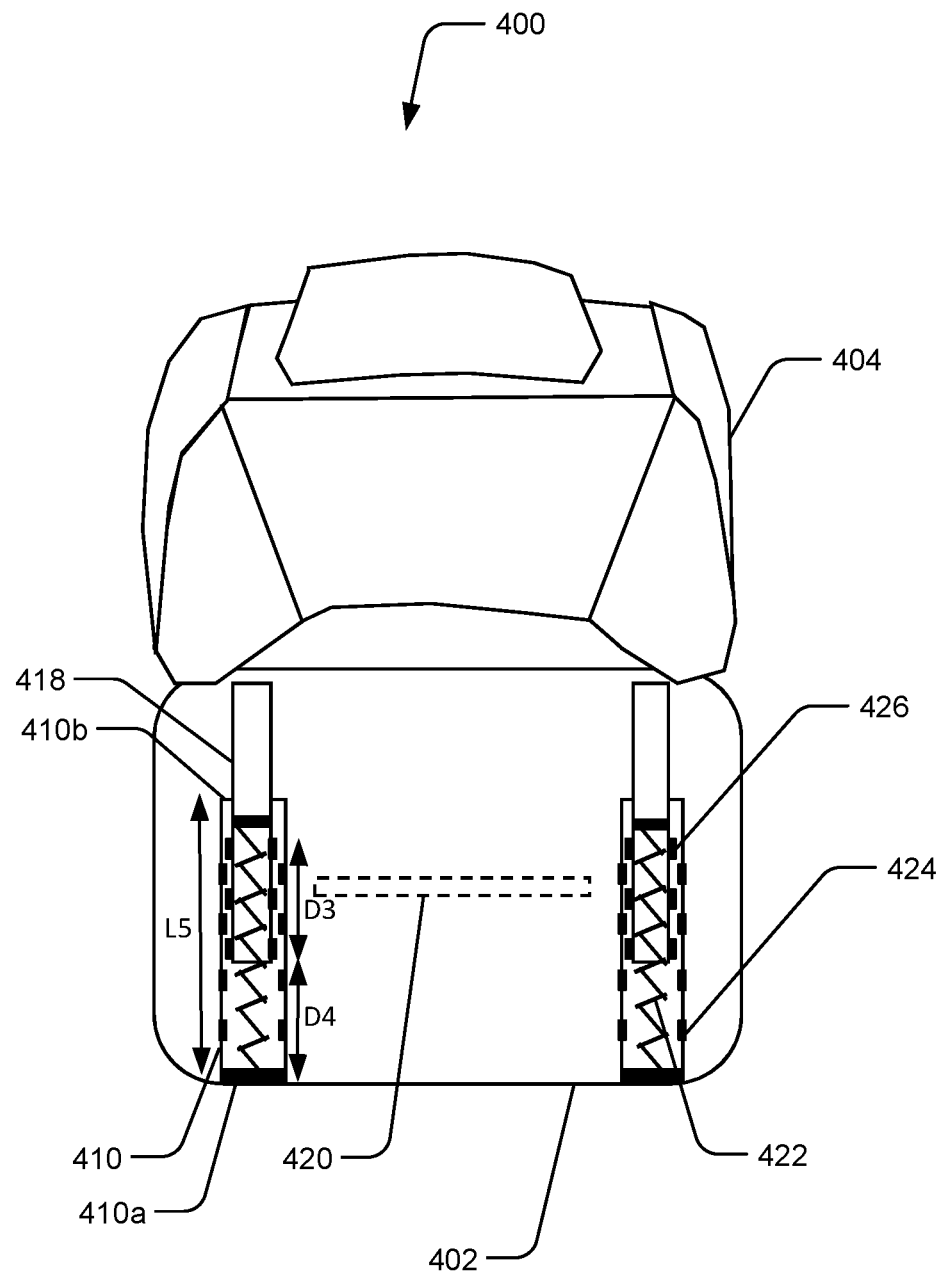
FIG. 5b illustrates the track and the guide disposed on the vehicle seat of FIGS. 4a and 4b in a final position.

FIGS. 5a and 5b illustrate top views of the vehicle seat 400 depicting an interaction between the track 410 and the guide 418. Specifically, FIG. 5a illustrates a top view of the vehicle seat 400 in the initial position while FIG. 5b illustrates a top view of the vehicle seat 400 in the final position of displacement caused by the crash event.

In the illustrated example, the track 410 is attached to the legs 412, 414 shown by dotted lines at the one or more fixation points 416. The track 410 has a longitudinal length L5 that extends from a proximal end 410a to a distal end 410b of the track 410. Further, the track 410 has a predetermined length D4 that is substantially equal to the predetermined displaceable distance D3 of the seat cushion 402. According to an example, the track 410 includes a first profile 424 along the longitudinal length L5 of the track 410. On the other hand, the guide 418 includes a second profile 426 along the longitudinal length L5 that matches with the first profile 424, such that the first profile 424 and the second profile 426 enable the guide 418 to move relative to the track 410.

According to an example, the vehicle seat 400 includes a pyro pin 420 that couples the seat cushion 402 and the track 410. The pyro pin 420 prevents displacement of the seat back 404 and the seat cushion 402 relative to the one or more fixation points 416. The pyro pin 420 can be structurally similar to the pyro pin 222 shown in FIG. 2a and can be coupled to one or more impact sensors (not shown in FIG. 5a) that can sense a collision of the vehicle. Further, the vehicle seat 400 includes a biasing element 422 that is coupled to a proximal end 410a of the track 410 and to a portion of the seat cushion 402. The biasing element 422, in operation, facilitates displacement of the seat cushion 402 during the crash event.

An operation of the vehicle seat 400 is now described with respect to FIGS. 4a, 4b, 5a, and 5b. Initially, when the vehicle has not encountered the crash, the vehicle seat 400 assumes the initial position as shown in FIGS. 4a and 5a. In the illustrated initial position, the guide 418 remains stationary with respect to the track 410. When the vehicle experiences the collision, the impact sensors sense an impact received during the collision to determine the crash event. As soon as the impact sensors sense the crash event, the impact sensors trigger the pyro pin 420 to severe the coupling between the seat cushion 402 and the track 410.

Once the coupling is severed, the biasing element 422 pushes the seat cushion 402 and the seat back 404 towards the interior panel 432. Further, the guide 418 moves along the longitudinal length L5 of the track 410 to facilitate the displacement of the seat cushion 402 and the seat back 404. As the guide 418 displaces the seat cushion 402 and the seat back 404, the movement of the seat cushion 402 and the seat back 404 reduces the effect of the crash event on the occupant 428 thereby protecting the occupant 428. In the illustrated example, the collision is a front collision. However, the collision can be a rear collision wherein the seat cushion 402 and the seat back 404 move away from the interior panel 432.

Figure 6A:
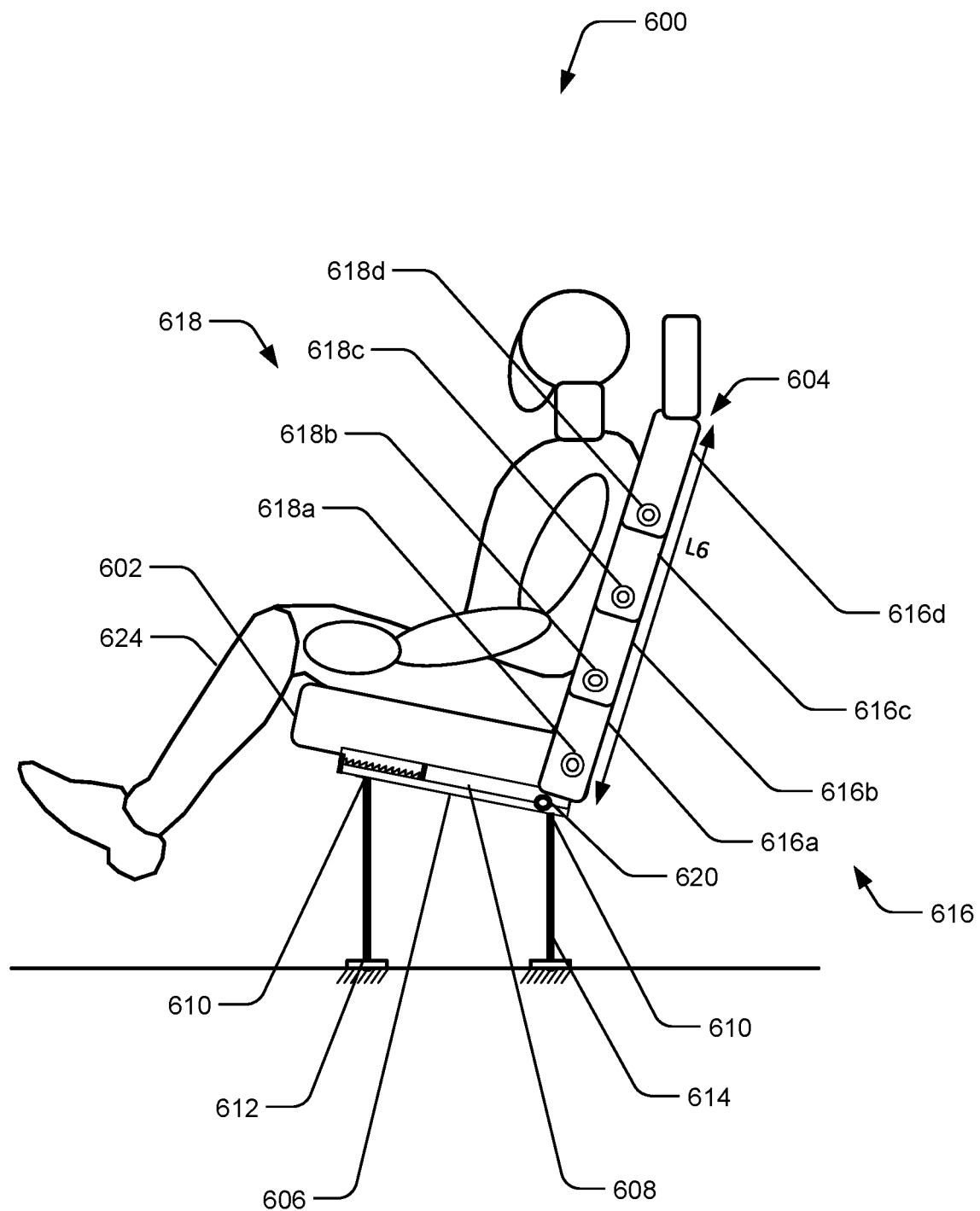
FIG. 6a illustrates yet another vehicle seat with a displaceable seat cushion and a pivotable seat back in an initial position, in accordance with one aspect of the present disclosure.
Figure 6B:
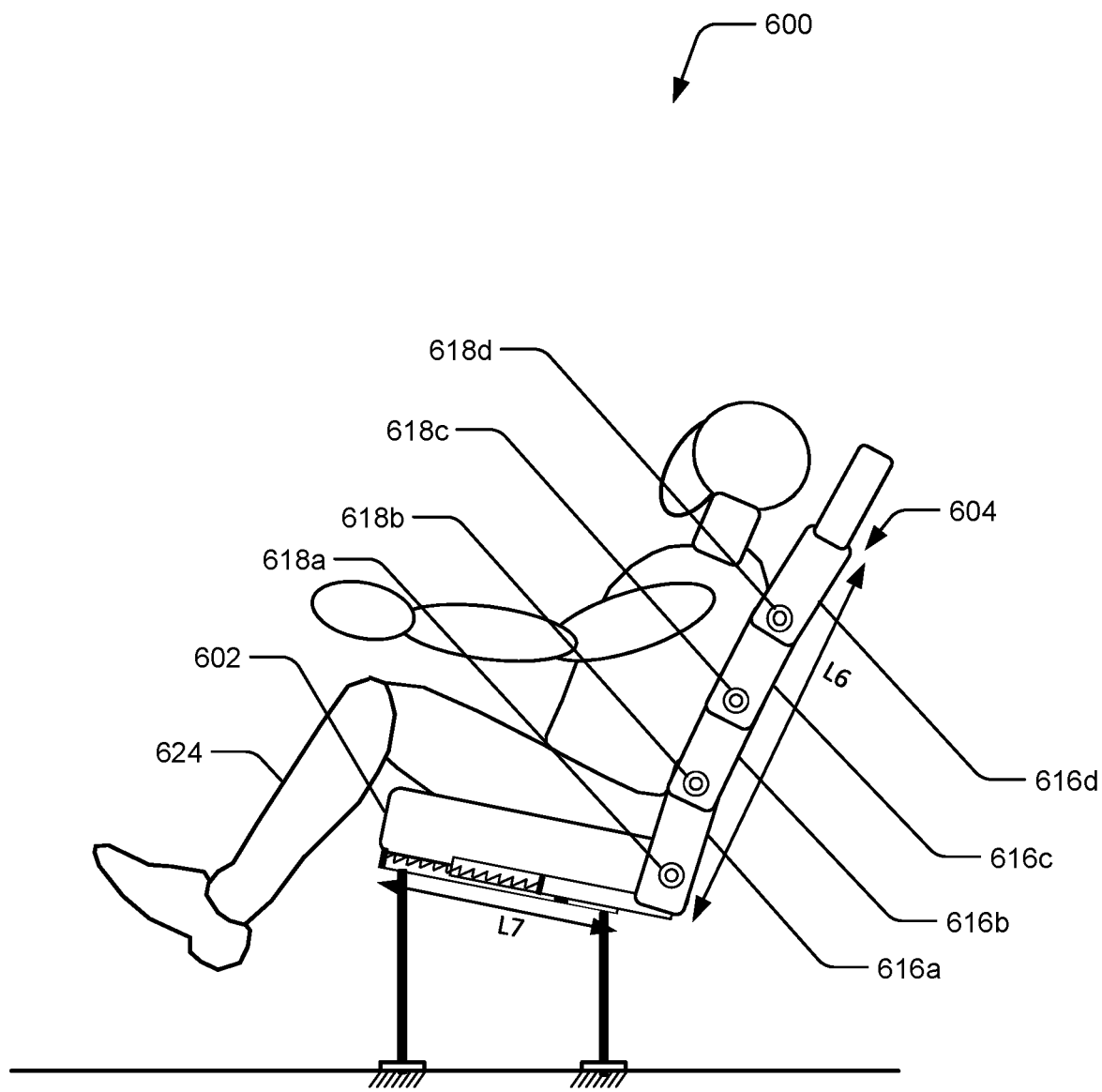
FIG. 6b illustrates the vehicle seat of FIG. 6a with the displaceable seat cushion and the pivotable seat back in a final position.

FIGS. 6a and 6b illustrate another vehicle seat 600 with a displaceable seat cushion 602 and a pivotable seat back 604, in accordance with an aspect of the present disclosure. Specifically, FIG. 6a illustrates the vehicle seat 600 in an initial position while FIG. 6b illustrates the vehicle seat 600 in a final position. The initial position refers to a position of the vehicle seat 600 before an event of sudden braking/deceleration or a crash event. The final position refers to a position of the vehicle seat 600 when the vehicle experiences an impact due to the sudden braking/deceleration or the crash event.

The vehicle seat 600 includes structural elements similar to the structural elements of the vehicle seat 400 as shown in FIG. 4a. For instance, the vehicle seat 600 includes a track 606 and a guide 608. The guide 608 is coupled to the seat cushion 602 in such a way that the track 606 allows the guide 608 and the seat cushion 602 to displace relative to the one or more fixation points 610 on a plurality of legs 612, 614.

The vehicle seat 600 also includes structural elements that are similar to the structural elements of the vehicle seat 300 as shown in FIG. 3a. For instance, the seat back 604 is made of a plurality of sections 616a, 616b, 616c, and 616d, collectively referred to as a plurality of sections 616, hereinafter. The seat back 604 further includes a plurality of pivot points 618a, 618b, 618c, and 618d, collectively referred to hereinafter as a plurality of pivot points 618. Each of the plurality of pivot points 618 are positioned along a longitudinal length L6 of the seat back 604 and are configured to pivotably couple with adjacent section of the plurality of sections 616. Further, the pivot points 618 have similar construction as that of the pivot points 312, as shown in FIG. 3a. Accordingly, each of the plurality of pivot points 618 includes a casing, a rotatable mount, a cutter, and a resistance material that offers the predetermined pivot resistance.

The vehicle seat 600 also includes a pyro pin 620, similar to the pyro pin 420 shown in FIG. 4a. The pyro pin 620 couples the seat cushion 602 with the track 606 to prevent a displacement of the seat cushion 602 with respect to the track 606 unless triggered by impact sensors (not shown). The impact sensors trigger the pyro pin 620 on occurrence of the crash event. Although not shown, the vehicle seat 600 includes a biasing element like the biasing element 422 as shown in FIG. 4a that facilitates the displacement.

An operation of the vehicle seat 600 is now described. Initially, the vehicle seat 600 is at the initial position in which the seat cushion 602 is prevented from the displacement and the seat back 604 is prevented from being pivoted. Further, when the vehicle collides, the impact sensors sense the collision and accordingly, triggers the pyro pin 620 to allow displacement of the seat cushion 602 with respect to the one or more fixation points 610 along a longitudinal length L7 of the track 606. As the seat cushion 602 displaces, the seat cushion 602 reduces the effect of the crash event on an occupant 624. Simultaneously, the impact enables the cutter to overcome the predetermined pivot resistance to severe the resistance material and allow pivoting of the seat back 604. In this case, the remainder of the impact is offset by the resistance material that absorbs the energy from the impact and causes the pivoting of the seat back 604. As a result, the combined effect of the seat back 604 and the seat cushion 602 protects the occupant 624 from the impact.

Although the present disclosure has been described with reference to specific aspects, this description is not meant to be construed in a limiting sense. Various modifications of the disclosed aspects, as well as alternate aspects of the present disclosure, will become apparent to persons skilled in the art upon reference to the description of the present disclosure. It is therefore contemplated that such modifications can be made without departing from the spirit or scope of the present disclosure as defined.

What is claimed is:

1. A vehicle seat, comprising:
    a substantially horizontal seat cushion;
    a seat back pivotally coupled with the seat cushion, the seat back having a longitudinal length extending from a proximal end adjacent to the seat cushion to a distal end;
    a plurality of pivot points disposed along the longitudinal length of the seat back, each pivot point of the plurality of pivot points having a predetermined pivot resistance, wherein each pivot point of the plurality of pivot points is operable to pivot in a crash event;
    wherein each of the plurality of pivot points has a cutter coupled therewith, the cutter operable to engage with a resistance material during pivoting.

2. The vehicle seat of claim 1, wherein the resistance material of each of the plurality of pivot points is a predetermined pivot resistance.

3. The vehicle seat of claim 1, wherein the predetermined pivot resistance of each of the plurality of pivot points is linear.

4. The vehicle seat of claim 1, wherein the predetermined pivot resistance of each of the plurality of pivot points is non-linear.

5. The vehicle seat of claim 1, wherein the seat back includes a plurality of sections, each of the plurality of sections coupled by one of the plurality of pivot points.

6. The vehicle seat of claim 5, wherein the each of the plurality of sections has a predetermined section height.

7. The vehicle seat of claim 6, wherein the predetermined section height of each of the plurality of sections is different.

8. The vehicle seat of claim 1, wherein the vehicle seat is rearward orientated.

9. A vehicle seat, comprising:
    one or more fixation points;
    a substantially horizontal seat cushion;
    a seat back pivotally coupled with the seat cushion, the seat back having a longitudinal length extending from a proximal end adjacent to the seat cushion to a distal end; and
    a track arranged adjacent to the seat cushion and coupled with the one or more fixation points, the track having a longitudinal length and a biasing element coupled at a proximal end of the track and with at least a portion of the seat cushion at a distal end,
    wherein during a crash event the seat cushion and seat back are displaceable relative to the one or more fixation points along the longitudinal length of the track;
    wherein the seat cushion is coupled with the track by a pyro pin that prevents displacement of the seat back and the seat cushion relative to the one or more fixation points.

10. The vehicle seat of claim 9, wherein the pyro pin is coupled with one or more vehicle impact sensors.

11. The vehicle seat of claim 9, wherein the biasing element is an elastic material having a linear elastic displacement.

12. The vehicle seat of claim 9, wherein the biasing element is an elastic material having a non-linear elastic displacement.

13. The vehicle seat of claim 9, wherein the vehicle seat is rearward orientated.

14. The vehicle seat of claim 9, wherein the seat back has a predetermined displaceable distance, and the track has a predetermined length substantially equal to the predetermined displaceable distance.

15. The vehicle seat of claim 9, wherein the seat back further comprises a plurality of pivot points disposed along the longitudinal length of the seat back, each pivot point of the plurality of pivot points having a predetermined pivot resistance, wherein each pivot point of the plurality of pivot points is operable to pivot in a crash event.

16. The vehicle seat of claim 15, wherein each of the plurality of pivot points having a cutter, the cutter operable to engage with a resistance material during pivoting.

17. The vehicle seat of claim 16, wherein the resistance material of each of the plurality of pivot points is the predetermined pivot resistance.

18. The vehicle seat of claim 15, wherein the predetermined pivot resistance of each of the plurality of pivot points is linear.

19. The vehicle seat of claim 15, wherein the predetermined pivot resistance of each of the plurality of pivot points is non-linear.

20. The vehicle seat of claim 15, wherein the predetermined pivot resistance of each of the plurality of pivot points is non-linear.

21. A vehicle seat, comprising:
one or more fixation points;
a substantially horizontal seat cushion;
a seat back pivotally coupled with the seat cushion, the seat back having a longitudinal length extending from a proximal end adjacent to the seat cushion to a distal end;
a track arranged adjacent to the seat cushion and coupled with the one or more fixation points, the track having a longitudinal length and a biasing element coupled at a proximal end of the track and with at least a portion of the seat cushion at a distal end,
wherein during a crash event the seat cushion and seat back are displaceable relative to the one or more fixation points along the longitudinal length of the track;
wherein the seat back further comprises a plurality of pivot points disposed along the longitudinal length of the seat back, each pivot point of the plurality of pivot points having a predetermined pivot resistance, wherein each pivot point of the plurality of pivot points is operable to pivot in a crash event;
wherein each of the plurality of pivot points has a cutter, the cutter operable to engage with a resistance material during pivoting.

22. The vehicle seat of claim 21, wherein the seat back includes a plurality of sections, each of the plurality of sections coupled by one of the plurality of pivot points.

23. The vehicle seat of claim 22, wherein the each of the plurality of sections has a predetermined section height.

24. The vehicle seat of claim 23, wherein the predetermined section height of each of the plurality of sections is different.

25. The vehicle seat of claim 21, wherein the vehicle seat is rearward orientated.

26. The vehicle seat of claim 21, wherein the seat cushion is coupled with the track by a pyro pin that prevents displacement of the seat back and the seat cushion relative to the one or more fixation points.

27. The vehicle seat of claim 21, wherein the biasing element is an elastic material.

28. The vehicle seat of claim 21, wherein the seat back has a predetermined displaceable distance, and the track has a predetermined length substantially equal to the predetermined displaceable distance.

* * * * *